UNITED STATES PATENT OFFICE.

JOHAN JACOB HAUG, OF ST. PETERSBURG, RUSSIA, ASSIGNOR OF ONE-HALF TO CASPAR HOFFMANN, OF SAME PLACE.

SUBSTITUTE FOR CAOUTCHOUC.

SPECIFICATION forming part of Letters Patent No. 305,184, dated September 16, 1884.

Application filed June 14, 1884. (No specimens.)

*To all whom it may concern:*

Be it known that I, JOHAN JACOB HAUG, a subject of the Emperor of Germany, and a resident of St. Petersburg, Russia, have invented new and useful Improvements in Substitutes for Caoutchouc, of which the following is a specification.

The object of my invention is to provide a substitute for caoutchouc, which substitute can be used with great success in place of caoutchouc, and has the advantage of being much cheaper.

The new material is prepared in the following manner: The skins of hares, rabbits, and other like small animals, or waste from the same, are washed in water and are deprived of the hair in lime-water or in any other suitable manner, and are then boiled in a Papin digester or closed boiler with about five per cent. of the weight of crude glycerine and as small a quantity of water as possible. Thereby a thick tenacious substance is obtained, which may be dried on nets in well-aired rooms or subjected to further treatment. Three parts of this substance are melted in a water or steam bath with three parts, in weight, of crude glycerine, and when the substance is melted one-fourth of the weight of the substance of a concentrated solution of chromate of potash or bichromate of potash or other like salt acted upon by light is added to the mixture. The mixture, which is now fluid, is poured into molds and permitted to cool under pressure in the molds. After the molded objects have been cooled they are taken out of the molds and dried in a dark and airy room. The superfluous water is evaporated much more rapidly in a dark than a lighted room, as in the latter case the surface hardens too rapidly, and thus prevents the evaporation of the water in the mass. The mass thus obtained is very much similar to vulcanized caoutchouc, and has the advantage of resisting heat much better than caoutchouc. If a substance similar to hard india-rubber (ebonite) is wanted, a smaller quantity of glycerine is used and a little more bichromate of potash is added, and the mass is dried under pressure between heated and polished metal plates. A hardness equal to that of glass is obtained if the objects, after having been dried, are placed in a solution of chromate of alum and are then again dried. The hard substance (ebonite) thus obtained can be sawed, ground, and polished. If the substance is not to be affected by acids, thirty per cent. of gum-laquer dissolved in alcohol is added to the mass.

By adding colors imitations of coral, malachite, tortoise-shell, &c., can be produced the same as with celluloid.

If the mass is to be used for objects that are to resist a high pressure and to have great elasticity—such as railway-buffers, wheel-tires, &c.—one part of crude glycerine and three-fourths of a part, in weight, of ground cork is mixed with it.

If a composition for water-proofing fabrics is desired, one-fourth of a part, in weight, of ox-gall is added, and enough salt-water is added to give it the consistency of thick oil. One-fourth of a part, in weight, of chromate of potassium is added in this case. The treacly mass thus obtained is placed in a steam-jacketed bath, in which rollers are arranged, under which the fabric under treatment is passed. The fabric thus treated is water-proof, but does not become tackey when subjected to heat.

Having thus described my invention, I claim as new and desire to secure by Letters Patent—

1. As a new article of manufacture, a substitute for caoutchouc prepared by treating skins with glycerine under pressure, and with the salts acted upon by light, substantially as shown and described.

2. The manufacture of a substitute for gutta-percha or cautchouc, by boiling skins and glycerine under pressure, mixing with the mass so obtained glycerine and chromate or bichromate of potash or other suitable salt acted on by light, with or without the addition of ground cork, ox-gall, and color, according to the different purposes for which it is intended.

In testimony whereof I have signed my name to this specification in the presence of two subscribing witnesses.

JOHAN JACOB HAUG.

Witnesses:
Z. MEUMLUM,
N. BAUMGARTH.